United States Patent

[11] 3,608,610

| [72] | Inventors | John L. Greatorex<br>Marblehead;<br>Dirk M. De Winter, Cambridge, both of Mass. |
|---|---|---|
| [21] | Appl. No. | 862,767 |
| [22] | Filed | Oct. 1, 1969 |
| [45] | Patented | Sept. 28, 1971 |
| [73] | Assignee | Ionics, Incorporated<br>Watertown, Mass. |

[54] APPARATUS FOR EVAPORATIVE SEPARATION OF LIQUIDS THROUGH MICROPOROUS PANELS
6 Claims, 4 Drawing Figs.

[52] U.S. Cl. ............................................. 159/13,
210/185, 210/321, 159/DIG. 27, 202/234
[51] Int. Cl. ............................................... B01d 1/22,
C02b 1/74, B01d 23/00, B01d 13/00
[50] Field of Search........................................... 203/12,
100; 202/234, 197; 210/22, 23, 180, 185, 321

[56] References Cited
UNITED STATES PATENTS

| 3,332,746 | 7/1967 | Claff et al. ................. | 23/258.5 |
|---|---|---|---|
| 3,385,769 | 5/1968 | Brose .......................... | 202/197 |
| 3,398,091 | 8/1968 | Greatorex ................... | 210/23 |
| 3,477,917 | 11/1969 | Rodgers ...................... | 210/23 X |
| 2,386,826 | 10/1945 | Wallach et al. ............. | 202/236 |
| 3,219,573 | 11/1965 | Chen et al.................... | 210/321 X |

*Primary Examiner*—Norman Yudkoff
*Assistant Examiner*—J. Sofer
*Attorneys*—Norman E. Saliba and Aaron Tushin ABSTRACT: A membrane permeation apparatus for removing one or more components from a fluid mixture comprising a plurality of two compartment units, each compartment defined by semipermeable membranes, wherein the first compartment is the fluid mixture feed compartment and the second a vapor compartment which is maintained under a partial vacuum, the latter having heating means therein for vaporizing a component of the fluid mixture at the adjacent semipermeable membrane surfaces defining said vapor compartment.

PATENTED SEP28 1971  3,608,610

INVENTORS
JOHN L. GREATOREX
DIRK M. DE WINTER

BY, Norman E. Saliba

ATTORNEY

APPARATUS FOR EVAPORATIVE SEPARATION OF LIQUIDS THROUGH MICROPOROUS PANELS

This invention relates to an improved method and apparatus for the separation or purification of fluid mixtures by means of the selective transfer of mass through a semipermeable membrane. More particularly, it relates to an improved membrane permeation apparatus and method of treating fluid mixtures wherein the heat required for vaporization of the process stream phase (fluid mixture) is applied by heating means or elements situated near or adjacent to the vacuum side of the semipermeable membranes. Specifically, it concerns an apparatus having alternating vacuum and fluid mixture or process stream compartments separated by semipermeable membranes wherein the heating means or elements are situated within the vacuum compartments with attendant advantages to be described hereinafter. For purposes of this disclosure, a fluid is defined as a liquid, vapor, gas or a mixture of the same, and a semipermeable membrane is defined as a barrier which is differentially permeable to one or more components of a fluid mixture.

Apparatus for effecting membrane permeable separation of liquid components are typified by the disclosures in U.S. Pat. No. 3,398,091 issued to J. L. Greatorex, Aug. 20, 1968, and U.S. copending application Ser. No. 786,634 filed on Dec. 24, 1968 by W. B. Iaconelli now U.S. Pat. No. 3,520,803. The above-mentioned patent and copending application are of a common assignee with the present patent application, and the information therein is hereby incorporated into the present disclosure by references thereto.

As may be noted in the prior art, the spacers forming the compartments of the apparatus have the shape of open frames which are separated from each other by a semipermeable membrane barrier or other type of thin barrier. The apparatus for carrying out semipermeable membrane separations are usually of the stack-type having a series of compartments or chambers between a pair of terminal pressure plates. The flow of fluids through the stack is by appropriate channeling through the gasketed areas of the spacers and membrane. The basic principle in the prior art of membrane permeation is effected in three compartment units as fully demonstrated in the apparatus of the U.S. patent and patent application noted hereinabove. In such a three-compartment unit the fluid mixture passes through the center compartment, the vacuum compartment being situated on one adjacent side thereof and separated therefrom by a semipermeable membrane with the third compartment (fluid-heating compartment) located on the opposite adjacent side and separated therefrom by a heat exchanger barrier sheet. It is to be noted here that the fluid-heating or hot water compartment is located on the opposite side of the fluid mixture compartment away from the semipermeable membrane where the phase change actually takes place. A plurality of such units with the proper channeling of the fluids passing through said compartments and repeating units does present an acceptable commercial membrane permeation system. However in such a system the heat required for the vaporization of the permeating component must pass under the influence of a temperature gradient from a region of high temperature within the fluid-heating compartment to the vacuum side region of the permeating membrane where the latent heat of vaporization is needed. Accordingly it is necessary that the fluid mixture in the center compartment be maintained at a temperature higher than the desired membrane temperature which to a large extent controls the rate of permeation. This of course is a distinct disadvantage when processing temperature sensitive materials.

The present invention is an improvement over the prior permeation apparatus in that certain advantages are obtained by the elimination of the hot water compartment or spacer noted above by substituting the required heating means in a location in proximity to the vacuum slide of the semipermeable membranes. Such heating elements may be effected by electric heat; specific heat from hot fluid circulation through tubular members located within the vacuum compartment; or latent heat from condensing vapors inside said tubular members. The main advantage obtained thereby is that the heat required for the vaporization of the component of the fluid mixture permeating through the semipermeable membrane is supplied by conduction from the said heating means or elements which are intimately associated with a porous support material (described hereinafter) in contact with the membrane surface where the actual vaporization takes place. This allows the process or mixture stream to be maintained at lower temperatures for the same rates of permeation than would be the case in the above-described prior art three compartment apparatus. Where the membrane metal support screen is employed as the electrical heating means the screen temperature will be approximately the same as the membrane it is heating. Such an arrangement causes a uniform permeation rate over the entire membrane surface and additionally thermal losses to the vapor phase are kept to a minimum. Other advantages will appear hereinafter.

Therefore, it is an object of this invention to provide heating means for the vaporization of the material permeating through the membrane at the point where the actual vaporization takes place for a more economical and efficient system.

A further object is to provide means for more even heating of the permeating material at the point of vaporization.

A further object is to provide means to effect membrane permeation at lower temperatures than formerly possible for the same rate of permeation.

Another object is to provide the heat of vaporization by direct conduction from heating elements integral with the membrane support structure in intimate contact with the membranes where the actual vaporization is effected.

Another object of this invention is to supply the heat for vaporization from within the vacuum compartment of a two compartment membrane permeation system.

Various other objects and advantages will become apparent hereinafter in connection with the appended claims.

For a fuller understanding of this invention, reference is made to the following detailed disclosure taken in conjunction with the drawings. For a better understanding of this invention the description and drawings are made with specific reference to a semipermeable apparatus; however, it is not to be construed as limited thereto except as defined in the claims since it is also useful in mass diffusion, gaseous diffusion, dialysis, electrodialysis, etc.

Briefly, membrane permeation will allow the composition of a liquid mixture to be changed by allowing a portion of the mixture to permeate through an appropriate membrane which is more selective to the passage of one or more components of the mixture relative to the remaining components. The components permeating the membrane are removed in a vapor phase and condensed for collection. The composition of the permeate vapor recovered at a given temperature and vapor pressure is determined inter alia by the composition of the feed mixture and by the character of the membrane. A membrane which is strongly hydrophilic will allow the selective permeation of water from a mixture but will impede the vaporization of organic constituents of the mixture. Thus for example, water can be removed from a coffee extract or from fruit and vegetable juices, tea, wine, etc. without removal of any significant fraction of the volatile flavor or aromatic constituents.

Figure 1:
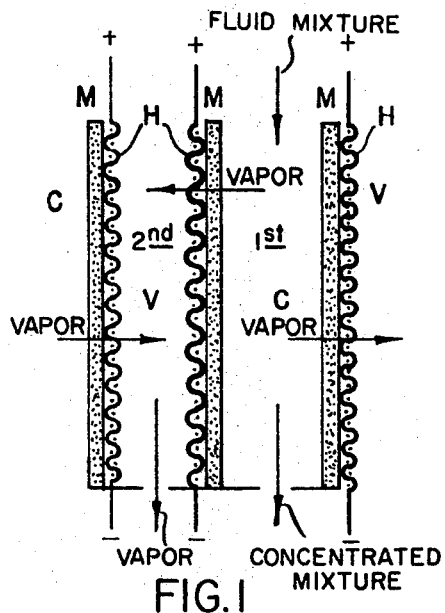
FIG. 1 is a diagrammatic representation of the invention in its most elemental form.

FIG. 1 is a representation of the invention in its simplest form which merely shows a two-compartment unit, C for the compartment containing the fluid mixture such as a coffee extract process stream and V for vacuum or vapor compartment, defined by semipermeable membranes M. The heating elements H in the vacuum compartment designate for example electric heating wires preferably in the form of a screen which may also function as a membrane support. The vertical arrows show the flow direction of the process stream in compartment C, and the vacuum pull of the vaporization permeate out of compartment V. The horizontal arrows show the permeation of the vaporized constituent (water in the case of coffee extract) through the membranes M. The membrane becomes swollen with water from the coffee extract while the driving force for permeation of the water through the membranes being provided by the water-content gradient within said membrane caused by a lower water pressure in the vacuum compartment V than the partial pressure of water in the process stream of compartment C. The heat necessary for the required phase change at the membrane is provided by the heating elements H on the vacuum side of the membranes which may also function to support the membranes.

Figure 2:
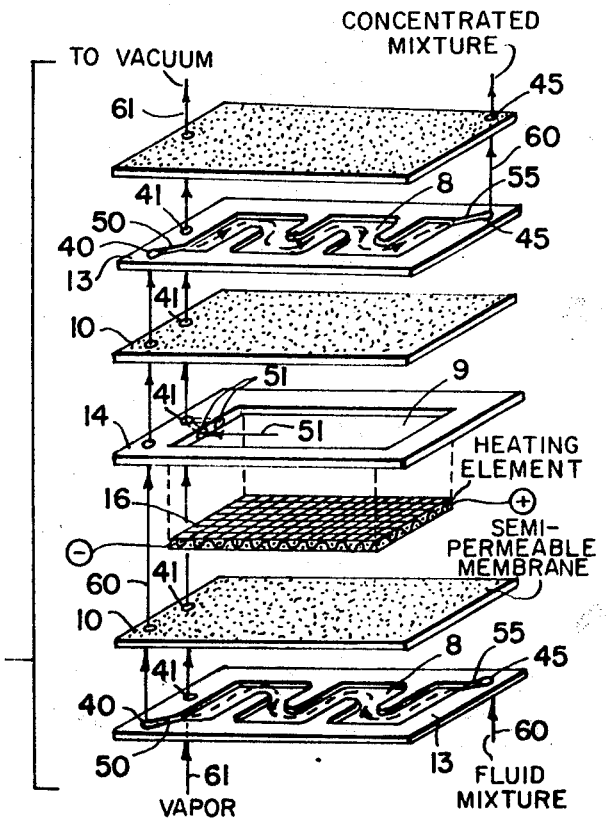
FIG. 2 is a perspective view of a section of a specific embodiment of the improved permeation apparatus showing the arrangement of the structural elements in expanded relationship with one another to illustrate the principle of the invention as applied to more than a single unit arrangement.

The permeation apparatus or stack as illustrated in the drawing of FIG. 2 is arranged similarly to a plate-and-frame filter-type press which may be operated in a horizontal or vertical position and comprises a plurality of basic two-chamber units placed between a pair of terminal end plates (not shown). It is to be understood that any number of basic units can be employed, the units arranged preferably in pairs in a repeated fashion between the end plates. A fluidtight stack is obtained by applying the proper pressure against each end plate as by nuts and bolts (not shown) or other pressure means. When the stack is operated in a horizontal position like that of a filter press, a skeleton framework made up of two end supports connected by horizontal parallel bars or rails may be employed. On these bars a varying number of the frames or spacers forming the compartments of each unit or cell can be supported and assembled into a fluidtight stack. The frames would be supported on the rails by means of a pair of conventional supporting arms or handles located on opposite ends of the spacer frames. The elements of the stack can be closed and tightened between the two end plates or heads by a screw or hydraulic ram connected to the moveable head which forces the spacer frames together.

In the vertical-positioned apparatus illustrated each basic repeating unit comprises two individual compartments 8 and 9 separated from each other by semipermeable membranes or barriers 10. The fluid mixture feed compartment 8 and vacuum compartment 9 are comprised respectively from spacer-frame members 13 and 14. Spacer frame, member 14 is generally thicker than the other spacer-frame member 13 and is conveniently formed or rigid, chemically inert materials such as plastic or stainless steel, etc. Associated with the marginal areas of each membrane 10 may be gasketing-frame means (not shown) to allow the membranes and adjacent spacer members to gasket with respect to one another. Associated with the vacuum spacer-frame member 14 is a membrane support-heating means 16 made of fluid-permeable materials such as metal screen which may also have layers of porous materials such as ceramic or plastic. The support-heating means is preferably held in the rigid frame of spacer 14 and made to fit into the vapor or vacuum compartment 9. This support-heating means 16 in vacuum chamber 9 is shown to have a double function; acting as a membrane support as well as an electric heating element for supplying the required heat of vaporization for the feed mixture at the surface of the adjacently disposed membranes 10. A more detailed description of the support-heating means 16 will be included hereinafter in reference to FIGS. 3 and 4. The support-heating means 16 is placed on both sides in direct face-to-face contact with the adjacent thin membranes to prevent the membranes from rupturing and bursting into the vapor compartment due to the difference of pressures which will exist between the feed mixture and vapor compartments during the usage method of operation. In place of a partial vacuum a sweep gas may be passed through the vacuum compartment to sweep out vapor compartments during the usage method of collecting therein. Ideally, the vapor compartment is completely sealed off from the adjacent feed compartment to insure that any fluid entering the vapor compartment will occur only by permeation through the separating semipermeable membrane barriers 10. The vacuum spacer-frame member 14 may have a thickness of, for example, 1 inch or even more which is ample for accommodating, if desired hot water or steam coils 86 for the heating means to be associated with the supporting element 16.

Spacer member 13 has etched or cut out central portions which preferably define a tortuous fluid-flow path area forming feed compartment 8. This compartment is confined by the frame of the spacer 13; said frame when fabricated of a pliable plastic material will also function to gasket with respect to the membrane adjacent thereto. The flowpath may also incorporate means (not shown) for promoting turbulent flow of fluid along the flow-path area as fully disclosed in the U.S. Pat. Nos. 2,708,658 issued May 17, 1955 to N. W. Rosenberg and 2,891,899 issued June 23, 1959 E. A. Mason.

The membranes 10 employed for permeation are well known in the art. Each membrane is formed as a semipermeable sheet or film made of an organic polymer such as natural and synthetic rubbers, neoprene, polybutadiene or other polyolefins, polyvinyl chloride, copolymers of vinylchloride-vinylidene, acrylonitrile, polyvinyl butyral, cellulose esters such as cellulose acetate, cellulose propionate, cellulose benzoate, cellulose nitrate, cellulose acetate-propionate, ethyl and methyl cellulose and also ion-exchange membranes, etc., to mention but a few of the many polymers that may be used. It is to be understood that the membrane material is chosen according to its permeation characteristics inasmuch as polymers of the type described exhibit different selectivities with respect to different liquids; hence, the choice depends on the nature of the mixture sought to be separated.

In the apparatus, particularly that illustrated in FIG. 2, each terminal pressure plate (not shown) may be provided with inlet and/or outlet connector tubes. To such tubes couplings can be made to carry fluid to and/or from the compartments via the conduits 60 and 61 of the stack by way of appropriate manifold holes 45, 40 and 41 and connecting channels 55, 50, and 51 which are provided in the gasketed areas of the spacers and/or membranes of the stack. Vacuum pumps (not shown) or other means may be provided at certain connector tubes to produce via conduit 61 the desired low pressure within the vapor compartments 9, or alternatively a sweep gas may be pumped through the vapor compartments to produce the desired low partial pressure of the component being permeated. Pumping means (not shown) are also provided at appropriate connecting tubes for the passage of a fluid mixture into feed compartments 8 and for the withdrawing of the fluid from said compartments.

The passage of fluid streams to the appropriate compartments and their withdrawal therefrom is managed by the manifold or conduit systems 60, and 61 which run internally through the stack in the general direction designated by the arrows. These conduits are formed by alignment of the appropriate holes or apertures located in the gasketed stack elements.

The drawing of FIG. 2 illustrates generally series flow internally through the stack of the feed stream through conduit 60, which is passed into one end of the stack and removed at the opposite end. However, it should be understood that the flow of the streams could be parallel through the compartments by merely changing the position of the apertures in the membranes and spacers accordingly.

The elements of the stack are normally provided with at least one vacuum manifold hole 41 in addition to other fluid manifold holes. The membrane 10 adjacent to each common vapor spacer 14 are normally provided in their gasketed area with manifold holes similar in number and location as the manifold holes in the said adjacent vapor-spacer frame. The other spacer-frame member 13 of the stack also contain vacuum holes 41 similarly situated so that on assembly of the stack a vacuum conduit 61 is formed internally through the cell by alignment of said vacuum manifold holes. The vapor compartments 9 formed by spacers 14 are connected to their respective vacuum manifold holes 41 by means of narrow passageways or connecting channels 51. In operation, the fluid component permeating the membrane will vaporize into the vapor compartment and be removed therefrom through connecting channels 51 and finally withdrawn from the apparatus via vacuum conduit 61 and collected at the appropriate outlet connecting tube (not shown).

It is preferably that two or more individual units be utilized in pairs between the end pressure plates so that a vapor compartment 9 defined on both sides by membranes 10 will be common to each unit of the pair. The vapor compartment 9 will thus serve to receive permeate from the two adjacent feed compartments 8 as shown in the drawings. It is to be understood that additional units from that illustrated may be placed in a repeating arrangement between the terminal pressure end plates.

Figure 3:
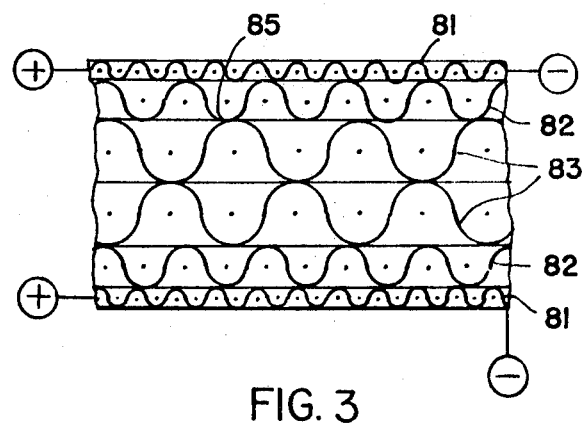
FIG. 3 is a cross-sectional representation of the porous membrane support structure provided with electrical heating means placed adjacent to the membranes.

FIG. 3 illustrates in vertical cross section an enlarged structure of a double-function porous support for the membrane and also the heating means. Such a structure should supply sufficient total membrane support and heat without unduly obstructing the removal of vapor permeate from the adjacent membranes. In the form shown for use in the apparatus of FIG. 2, the outside surfaces of element 16 are provided with a thin spread sheet 81 of highly porous or fine mesh material for example a fine mesh or woven heat-producing screen of electrical resistance wire which is in direct contact with the membrane. This fine metal screen within vacuum frame 14 presents a flat surface with the gasketing edge of the frame. A mesh size between 25 to 80 (U.S. Sieve Series) has been proven satisfactory, the preferred size range being between 45 to 55. The fine mesh screen may be supported and in direct contact with an associated backup metal screen 82 of much larger mesh or pore size which may also be employed as the electrical heating element. This backup screen generally possesses a mesh or pore size 3 to 6 times larger than the finer screen 81, the preferred mesh size being between 5 to 10. Thus the vapor or vacuum compartment 9 enveloped within the spacer frame is confined on both sides by the combination of a fine and coarse mesh or pore material. To give structural support to each pair of screens or porous sheets it was found advantageous to employ highly perforated subsupport means 83 placed between the two sets of screen pairs substantially filling the vapor compartment. The subsupport means 83 should be provided with a multiplicity of large channels or pores to provide passageways for vapor movement as unimpeded as possible but still provide complete support for the pair of screen. The subsupporting element although possessing a highly foraminous or expanded structure should have a plurality of supporting points 85 in direct contact with each juxtaposed coarse mesh backup screen. The subsupport may have a pyramidal or corrugated design. A particularly excellent subsupporting structure is one known as SUPER-TUBULUS having substantially oval-type tubular openings. Structures having such a SUPER-TUBULUS design are available commercially from Krieg and Zivy Industries, Paris France. The type employed in the present invention and found satisfactory was constructed of 316 stainless steel with the long axis of the tubular opening measuring about 3/4 inches and the short axis about 3/16 inches. SUPER-TUBULUS as well as commercially available expanded metal mesh is the preferred material for use as the foraminous subsupporting structure. Both materials are made by cutting rows of a series of fine slits in a sheet of the desired material. To form the expanded mesh material the sheet is pulled perpendicular to the long axis of the slits resulting in the expansion of the slits to form essentially expanded diamond-shaped holes. In the case of the SUPER-TUBULUS supporting structure it appears that two opposite ends of the sheet are pushed together parallel to the direction of the slits forcing the metal defined within the area of two adjacent slits to bulge and push away as a metal strip in a direction perpendicular to the face of the sheet. The forcing is controlled to allow every alternate metal strip in each row to bulge out in one direction and the remaining strips in the row in a diametrically opposite direction to form the tubular openings and associated support points 85. An external supply of electric current appropriately regulated to effect the desired heating of the membrane surfaces in contact with said electrical resistance wire support is only shown symbolically since this is well known, per se and need not be further detailed herein. It is also apparent that any one or all of the layers of porous screen 81, 82 and 83 if made of the appropriate material may be used for heating purposes as required by connection to an appropriate source of electric current.

Figure 4:
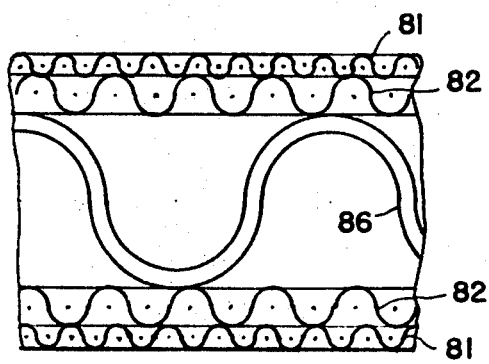
FIG. 4 is another cross-sectional representation of a membrane support structure which is centrally provided with tubular heat conductive means containing a circulating media such as hot water or steam for conducting heat to the membrane surfaces.

FIG. 4 is an alternate representation of support-heating means 16 wherein the central section of the support structure is shown as a heat-conducting tubular coil 86 through which hot water or steam may be passed as the agent for supplying heat by conduction to the adjacent membranes. These coils would enter and leave the vacuum compartment through ducts located into the side edges of the spacer frame.

The operation of the apparatus may be more fully described by referring to FIG. 2 where a stream 60 of a fluid feed mixture preheated to about 130° F., is distributed to each feed compartment 8 in a multiunit stack by flowing said mixture internally through the stack in series from one feed compartment to another feed compartment and so on. It is apparent that the feed stream can be made to flow in a parallel arrangement through each feed compartment if desired with proper positioning of the inlets and outlets as for example into the side edges of each vacuum frame spacer as fully disclosed in copending U.S. Pat. application No. 786,634 now U.S. Pat. No. 3,520,803. In a second stream 61 a partial vacuum is maintained with vapor removal through channels 51 located in the vapor compartments 9. The two streams are of course maintained separate from each other. In accordance with the present procedure, a feed stream 60 of a liquid mixture, for example an aqueous coffee extract having 15 percent solids, is passed by pumping means into a terminal plate inlet feed tube (not shown) at a rate of about 2.2 gallons per hour in a direction as shown by the arrows 60. Although the stack shown is comprised of a single two compartment unit with the beginnings of adjacent additional units, the present apparatus was expanded into several units covering a total effective membrane permeation area of about 40 square feet. The feed mixture stream 60 entering manifold aperture 45 of feed compartment 8 flows in a tortuous path through connecting channel 55 across said feed compartment to outlet manifold aperture 40 via connecting channel 50. The stream leaving this feed compartment is forced to flow through the aligned apertures of membrane 10 (for example a membrane comprising cellulose nitrate), vapor spacer 14, a second membrane 10, into aperture 40, of the next feed compartment 8 then through connecting channel 50 through the feed compartment into connecting channel 55 and out through aperture 45 to repeat as before. Eventually after passing in series flow through all the remaining feed compartments in the manner described, it is finally withdrawn from the apparatus at an appropriate outlet tube (not shown). Simultaneously therewith a second stream 61 of vapor is withdrawn from each of the vapor compartments 9. The support-heating means 16 of electrical resistance wire is heated by a source of electric current (not shown) which maintains the temperature at about 140° F. and transfers its heat directly to both adjacent membranes 10 at the very point where vaporization of the permeating liquid component of the feed mixture takes place within the vacuumized vapor chamber.

The pressure in the vapor compartment is maintained at lower pressures than that in the feed compartment, for example, by a partial vacuum in the compartment through evacuation at the appropriate tube outlets using a vacuum pump or other suitable device. Water from the feed coffee extract contained in feed compartment 8 preferentially permeates the water permeable cellulose nitrate membranes 10 and emerges from the lower pressure side of the membrane as a water vapor where it is quickly removed via connecting channel 51. The vapor is withdrawn from the stack at outlet tubes associated with the pressure end plates and then condensed and finally collected at a rate of about 1.7 gallons per hour. It is apparent that the vapor removed from the apparatus may be used to preheat the feed mixture entering the apparatus for processing. A product coffee fluid of 50 percent solids at a flow rate of about 0.5 gallons per hour resulted from the operation.

The apparatus described above consists of five process stream spacers, 10 membranes, six vapor compartments with associated membrane support metal screens, the latter being used as electrical resistance heaters.

The number of units employed between the end plates of a stack and the membrane area available for transport can of course vary depending on the volume of feed required to be processed. A plurality of consecutively arranged permeation stacks may be used to effect a high degree of concentration or separation, in which case the effluent mixture from one stack may serve as the influent feed mixture to the next stack, and so on. The permeation apparatus may be employed in a continuous operation or may be applicable to batch type or bleed and feed streams.

The description of the invention and the drawings have been made with specific reference to a membrane permeation apparatus and process; however, the invention is not to be construed as limited thereto except as defined in the appended claims and is, in particular, useful also in mass diffusion, gaseous diffusion (molecular effusion) dialysis, electrodialysis, piezodialysis, thermodialysis, osmosis, electro-osmosis, piezo-osmosis (reversed osmosis) thermoosmosis, ultrafiltration (hyperfiltration), electrodecantation and other membrane separation processes.

What is claimed is:

1. A separation apparatus for the removal of one or more components from a fluid mixture containing the same comprising; at least one unit having two adjacent compartments separated by a semipermeable membrane, the first compartment having inlet and outlet means for passing a fluid feed mixture therethrough, the second compartment having means comprising a spacer-frame member permitting evacuating the space therein and also containing therein electrical heating means for supplying within said second compartment the latent heat required for vaporizing said one or more components of the fluid mixture at the surface of said separating membrane, said heating means confined totally within said second compartment with said heating effected solely in situ and means for removing said vaporized component from the said second compartment.

2. The separation apparatus of claim 1 wherein a plurality of interconnecting units is disposed in juxtaposed position so that each first compartment is contiguous to two second compartments and vice versa.

3. The apparatus of claim 1 wherein said second compartments are thicker than the said first compartments, said thicker compartments being provided with a plurality of tubes or ports associated with the side edge of the said spacer-frame members forming said second compartments, said tubes or ports being in communication with vapor and liquid flow conduits of said apparatus whereby said vapor and liquid streams are introduced and withdrawn from said units directly through said tubes or ports.

4. A separation apparatus for the removal of one or more components from a fluid mixture containing the same comprising; at least one unit having two adjacent compartments separated by a semipermeable membrane, the first compartment having inlet and outlet means for passing a fluid feed mixture therethrough, the second compartment having means comprising a spacer-frame member associated therewith permitting evacuating the space therein and also containing therein both membrane-support means and means for electrically heating insitu said support means, said support means comprising a laminate of metal sheets having differing porosities, the most finely porous sheet being placed in contact with the membrane being supported, said heating means supplying from said second compartment the latent heat required for vaporizing said one or more components of the fluid mixture at the surface of said separating membrane and means for removing said vaporized component from the said second compartment.

5. The apparatus of claim 4 wherein at least one of said metal porous sheets functions as an electrical heating means.

6. The apparatus of claim 5 wherein the porous sheet in contact with the membrane functions as said electrical heating means.